United States Patent

[11] 3,633,425

| [72] | Inventor | Robert A. Sanford |
| | | Marblehead, Mass. |
| [21] | Appl. No. | 449 |
| [22] | Filed | Jan. 2, 1970 |
| [45] | Patented | Jan. 11, 1972 |
| [73] | Assignee | Meditech Energy and Environmental Corporation |
| | | Danvers, Mass. |

[54] CHROMATIC TEMPERATURE INDICATOR
22 Claims, 4 Drawing Figs.

[52] U.S. Cl. .................................................... 73/356
[51] Int. Cl. ............................................. G01k 11/16
[50] Field of Search ........................................ 116/114 V;
73/356; 252/408; 23/230 LC; 260/397.2

[56] References Cited
UNITED STATES PATENTS

| 3,440,882 | 4/1969 | Jones | 73/356 |
| 3,243,303 | 3/1966 | Johnson | 116/114.20 |
| 3,409,404 | 11/1968 | Fergason | 252/408 |
| 3,524,726 | 8/1970 | De Koster | 73/356 |
| 3,441,513 | 4/1969 | Woodmansee | 252/408 |
| 3,533,399 | 10/1970 | Goldberg | 73/356 |

*Primary Examiner*—Louis R. Prince
*Assistant Examiner*—Denis E. Corr
*Attorney*—Cesari and McKenna ABSTRACT: A fever indicator which can be visually monitored by observation of a temperature-dependent color-changing characteristic thereof. Said indicator is advantageously formed of a mixture of liquid crystals, e.g., a mixture formed of cholesteryl pelargonate and cholesteryl oleyl carbonate and maintained in contact with a porous and inert, but translucent, material. The mixture is incorporated into an apparatus comprising a reservoir, which can be formed of the porous inert material, and normally includes a fastening means for holding said reservoir in close contact with the body of a patient. Where a black background is required to aid the visibility of the color change, graphite-type carbon powders have been found most advantageous for use.

PATENTED JAN 11 1972 3,633,425

INVENTOR
ROBERT A. SANFORD
BY
Cesari and McKenna
ATTORNEYS

CHROMATIC TEMPERATURE INDICATOR

BACKGROUND OF THE INVENTION

1. Field of the Invention

This invention relates to a novel apparatus for visual detection of physiological temperature changes using a temperature-responsive chemical mixture.

2. The Prior Art

With the increasing costs of operating hospitals and—in particular— with the increasing cost and short supply of adequately trained nurses and other personnel, it is most desirable to reduce the time which must be spent in monitoring each patient's body temperature. This saving in time, may be accomplished by eliminating the precise temperature readings of patients who do not require such precise monitoring of temperature. Another advantage of eliminating conventional temperature-detecting techniques relates to certain seriously ill patients for whom use of oral thermometers is impractical because they cannot, or will not, keep their mouths closed for the requisite time period. Some of these patients have illnesses which may make insertion of a rectal thermometer or the like either inconvenient or medically undesirable; for example, some cardiac patients are susceptible to initiation of a cardiac arrest when rectal thermometers are utilized in an attempt to read their fever. Therefore, there is a need for a fever indicator which can be maintained in a visible position on the patient's body and which will give a visible signal when the temperature exceeds a given value.

In addition to the utility on people described above, it will be noted that such a fever indicator has high utility in veterinary practice.

There have been a number of attempts to develop fever indicators which contain a chemical reaction system adapted to change color with temperature. Such systems give promise of allowing a quick qualitative measurement of a patient's temperature. One such device, that disclosed by Geldmacher in U.S. Pat. No. 3,175,401, has the disadvantage of requiring the patient to place it in his mouth. Cholesteric liquid crystals are utilized in another relatively complex device disclosed by Jones in U.S. Pat. No. 3,440,882, but the visibility of the color depends on a black background surface and the thermally responsive, liquid crystal mixtures suggested for use by Jones leave much to be desired. Moreover since such materials are expensive, it has been desirable to find more economic means to take advantage of their color-changing characteristics.

Thus it has been known that certain organic chemicals, including many cholesteric liquid crystals, have the property of changing color with temperature, and it has been suggested that such materials be used for physiological applications including coating the skin therewith to analyze the temperature of underlying veins, etc. But, thus far, no really simple economical and reliable device has been developed for general use as in hospital wards.

SUMMARY OF THE INVENTION

Therefore, it is an object of the invention to provide a novel and economical fever indicator exhibiting a temperature-sensitive color characteristic which may be read by a cursory inspection thereof.

Another object of the invention is to provide an improved fever indicator utilizing a particularly advantageous mixture of cholesteric liquid crystals.

Still another object of the invention is to provide a novel cholesteric liquid crystal composition comprising a novel, inert and effective color-enhancing additive.

A further object of the invention is to provide a quick-responding temperature indicator having improved color visibility characteristics.

Other objects of the invention will be obvious to those skilled in the art on reading the instant application.

The above objects have been substantially achieved by utilizing a novel composition including cholesteric liquid crystals contained in a reservoir means in the presence of a porous translucent, high-surface material such as a translucent network formed of particles, e.g., glass beads, plastic, quartz beads and the like. It has also been discovered that an inert, heat-conductive black powder such as graphitized carbon black can be advantageously utilized as an aid in improving the visibility of the color change of the mixture of liquid crystals.

The color-imparting organic chemicals useful in this invention are selected from the cholesteric liquid crystals. These materials are described in the Scientific American Magazine of Aug. 1964 as a class of liquid crystal molecules having a tendency to align themselves in a multilayer "liquid crystal" structure characteristic of a large number of compounds that contain a cholesteric group. However, it is not intended to limit this disclosure to cholesteryl derivatives; all molecules aligning themselves in a definitive characteristic physical structure are meant to be included in the general term "cholesteric liquid crystals" as it is used herein. Such cholesteric crystals have molecules arranged in thin parallel layers, each layer comprising a number of molecules tending to lie parallel to each other but not oriented to be lying parallel to the molecules in the adjacent layers.

Among some such cholesteric crystals are cholesteryl pelargonate; cholesteryl oleate; cholesteryl octanonate; cholesteryl acetate; cholesteryl docosonoate; cholesteryl paranitrobenzoate; cholesteryl propionate; alkyl amides and aliphatic secondary amines derived from 3-beta-amino delta-5-cholestene; carbonates and carbonates of cholesteryl, including those such as cholesteryl heptyl carbonate, cholesteryl oleyl carbonate and the like.

The most advantageous cholesteric liquid crystal composition for use in the invention is a mixture of cholesteryl pelargonate and cholesteryl oleyl carbonate. This mixture is quick-responding and has highly visible color change in the temperature range of interest.

The exact mechanism by which the inert translucent materials operate is not precisely known, but it is hypothecated that the combination of large surface area of the beads and the void volume necessarily occurring between the beads allow a very large basically continuous surface area of liquid crystal mixture to be enclosed within a small volume. The average diameter of effective translucent particles can vary considerably but beads having average diameters from 0.1 millimeters to 10 millimeters are the most efficient for use in small reservoirs of the type which can be utilized as fever indicators on sick people. However, it should be realized that smaller and larger particles can be used so long as translucence is maintained. Moreover the particles need not be spherical but can be of any shape which will provide high-surface area and prevent such compact packing of the particles that the liquid crystal mixture is effectively prevented from having an effective presence in voids among the particles.

Surprisingly, it has been discovered that no black background is required in many embodiments of the invention. For example, clear plastic powders in the 10-mesh to 300-mesh range do not require a dark background. When used in weight ratios of from about 0.1:1 to 10.1 with the liquid crystal mixture. Nor do glass beads require a dark background in the 0.2 millimeters to 1 millimeter range when employed in ratios of from 1:1 to 3:1 with the liquid crystal mixture. Fever indicator devices formed of such mixtures have been found to be advantageous with respect to devices using a black background as the prime color-viewing aid.

In the manufacture of fever-indicating devices according to the invention, it is advantageous to add the liquid crystal mixture (usually in a paste, gel or viscous liquid form) to the reservoir. Then the translucent particles are added and, after the reservoir has been sealed, the device is warmed to reduce the viscosity of the liquid crystal mixture and then shaken to coat the bead with the mixture.

It should also be noted that the beads may be fused together to form an integral reticulated structure and, indeed, a clear reticulated plastic foam structure is approximately as advantageous for use in the invention as clear glass beads.

When translucent foam having very small pores is used, especially pores below about 1 millimeter in average diameter, the impregnated foam is reasonably dry to the touch, and it may be utilized directly. Usually, however, it is more desirable to enclose it in a protective transparent covering.

There is no practical upper limit on the size of pores of the foam that can be used, but there is usually a significant decreasing efficiency with respect to cost and improved visibility as the average diameter of the pores goes upwards from about 10 millimeters.

In order to achieve the maximum visibility of some fever indicators of the invention it will be desirable to utilize them against a black background. This can be achieved by using a black particulate material well dispersed in the mixture of liquid crystals. Heretofore carbon-black, a material having a relatively large quantity of organic contaminants ("volatiles") thereon, has been suggested for use with liquid crystals. This material, by and large, is better than light-absorbing metal powders which, although conductive, tend to settle out of a mixture because of their high-specific gravity. However it has now been demonstrated that the use of a graphitized carbon, such as the high-temperature, post-treated channel black obtained under the trade designation Spheron from Cabot Corporation, avoids any of the problems associated with the presence of organic contaminants on the normal carbon black surfaces and also yields a higher heat conductivity of the mixtures into which it is incorporated. Surprisingly up to about 20 percent by weight of such black particles, even those derived from the graphitizing of very small channel black particles, can be incorporated without interference with the improved visibility color change. Higher percentages may be incorporated where the particle size of the black is larger. Moreover, as little as about 0.3 percent of black has been found effective in indicating the color change of the liquid crystal mixture. It will be understood that graphite carbon powder is also useful in the invention.

It is possible to incorporate the temperature-sensing compounds, compositions, and mixtures of the invention into chemically inert liquid vehicles and utilize the result composition for sensing of temperatures. In general, useful compositions can be prepared over an entire range of viscosities: even pastelike compositions are operable.

ILLUSTRATIVE EMBODIMENT OF THE INVENTION

In this application and accompanying drawings we have shown and described a preferred embodiment of our invention and suggest various alternatives and modifications thereof, but is to be understood that there are not intended to be exhaustive and that other changes and modifications can be made within the scope of the invention. These suggestions herein are selected and included for purposes of illustration in order that others skilled in the art more fully understand the invention and the principles thereof and will be able to modify it and embody it in a variety of forms, each as may be best suited in the condition of a particular case.

In the Drawings

Figure 1:
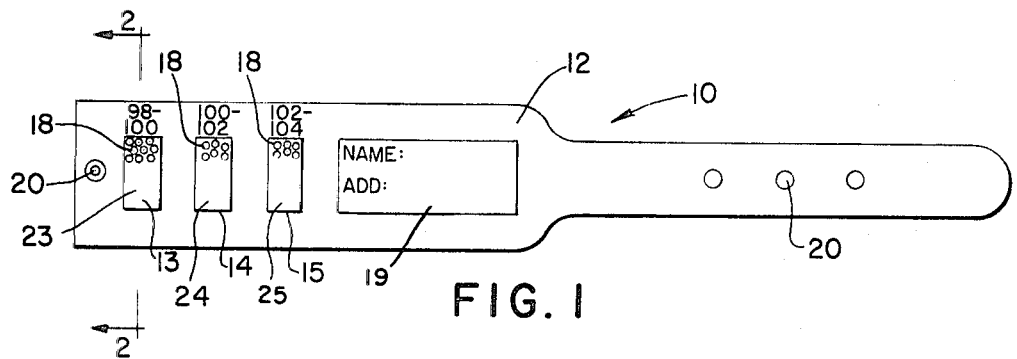
FIG. 1 is a plan view of an improved temperature-sensing device constructed according to the invention.

The drawings will be described in more detail after working examples 1 through 4 have been set forth to illustrate some compositions useful in the practice of the invention.

WORKING EXAMPLE 1

Table A lists mixtures comprising a major portion of cholesteryl oleyl carbonate (identified below as compound B) and cholesteryl pelargonate (identified below as compound A):

TABLE A

| Sample | Parts A | Parts B | Temp. Range °F. | Parts Graphitized Carbon |
|---|---|---|---|---|
| 1A | 10 | 10 | 79–81 | 5 |
| 2A | 10 | 7 | 92–94 | 5 |
| 3A | 10 | 6 | 99–101 | 0.5 |
| 4A | 10 | 5.5 | 102–104 | 0.05 |
| 5A | 10 | 5.0 | 105–107 | 0.005 |

These mixtures all exhibit color change from colorless through red and yellow to a violet color in the temperature range indicated in the table. It will be noted that sample 3A, changing color temperature range of 99° to 101° F., can be used to identify any change in temperature of a patient, who, although expected to run a slight temperature, would require closer attention if the expected temperature, (say 101° F.) were to be exceeded.

The graphitized carbon powder is obtained from Cabot Corporation under the trade name Spheron. This material is very clean comprising less about 0.1 percent or less of volatile matter as measured according to ASTM Test D–1620–60.

WORKING EXAMPLE 2

The same mixtures as described in example 1 were repeated. However translucent particles are substituted for graphitized carbon black as follows: "B" is used instead of "A" to identify the substituted formulation of this example.

| Sample | Translucent Filler | Filler Volume % |
|---|---|---|
| 1B | Glass beads, 0.5 mm. averages diam. | 30% |
| 2B | Glass beads, 0.5 mm. average diam. | 10% |
| 3B | Poly(methyl methacrylate) powder, 20 mesh | 20% |
| 4B | Poly(methyl methacrylate) powder, 200 mesh | 38% |
| 5B | Glass beads, 1.0 mm. average diam. | 25% |

WORKING EXAMPLE 3

Samples 4A and 4B were mixed together to yield a sample 4C, and samples 5A and 5B were mixed to yield a sample 5C. Each of samples 4C and 5C were rapid-responding, highly visible temperature ranges 102° to 104° F. and 105° to 107° F., respectively.

WORKING EXAMPLE 4

To demonstrate, in a quantitative way, the value of the invention in enhancing the visibility of color changes in cholesteric liquid crystal mixtures, a test was developed whereby the changes in scattering of white light by liquid crystals in various environments was related to the quality of the visible color change.

In this test a photocell was placed at the top of an 8-inch long cylinder having black (i.e., nonreflective) interior walls. The bottom of the cylinder was closed excepting for a 0.125-inch aperture therein. The liquid crystal sample was positioned about 2 inches below the cylinder. Light was incident upon the sample from a 60-watt tungsten-filament lamp positioned about 6-inches above the sample and to the side of the aforesaid cylinder. Thus light from the lamp reflected from the sample, through the aperture, up the cylinder and onto the aforesaid photocell.

The photocell is connected into a resistance bridge and the resulting resistance ratios $Ar$ were converted to electrical resistivity $R$ by means of the following relationship:

$$R = 400,000 \times Ar/1-Ar$$

The resistivity values, i.e., the changes in light scattering, which took place for a number of differently packaged mixtures of cholesteryl oleyl carbonate and cholesteryl pelargonate as they were heated from 79° to 81° F. are set forth in table C.

| Packaging of Liquid Crystal Sample | Change in resistivity, R megohms |
|---|---|
| 1. On glass slide with black background | 11 |
| 2. On and around glass beads with black background | 24 |
| 3. Mixed with graphitized carbon black and in reticulated polyurethane foam reservoir | 28.5 |

Thus it is seen that use of glass beads gives a light-scattering value of more than twice the use of black background alone and that a reticulated foam-type reservoir enhances even further the color change of a graphite-bearing liquid crystal formulations.

It is, of course, to be understood that the foregoing examples are intended to be illustrative and that numerous changes can be made in the reactants, proportions, and conditions set forth therein without departing from the spirit of the invention as defined in the appended claims.

Referring now to FIG. 1, it is seen that a fever indicator 10 comprises a flexible wrist strap 12 utilized to hold three reservoirs 13, 14 and 15. Each reservoir is adapted to hold a different mixture of liquid crystals and glass beads 18. For example, mixture 23 in reservoir 13 responds to temperature by changing color in the 98° to 100° F. range; mixture 24 in reservoir 14 changes color in the 100° to 102° F. range; and mixture 25 in reservoir responds to temperature with a color change in the 102° to 104° F. range.

A patient identification form 19 suitable for receiving ink is provided on strap 12 and fastening means 20 is provided for attaching strap 12 to the patient's wrist. Mixtures 23, 24 and 25 are selected by interpolating the data presented in table A of example 1 and thereby providing a suitable mixture of cholesteryl pelargonate and cholesteryl oleyl carbonate.

Figure 2:
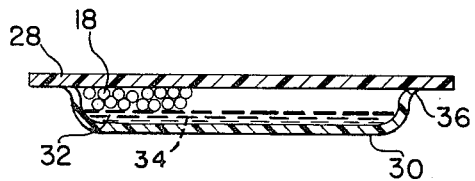
FIG. 2 is a cross section of an element used in the device shown in FIG. 1.

FIG. 2 illustrates one mode of making such a device as is shown in FIG. 1;

Beads 18 are first bonded to a transparent plastic sheet 28. Lower plastic sheet 30 is dished to provide reservoir 32 into which a small quantity of a cholesteric liquid crystal mixture 34 has been placed.

Sheets 28 and 30 are brought together and a heat seal 36 is effected about a perimeter of the reservoir to form the finished article.

Figure 3:
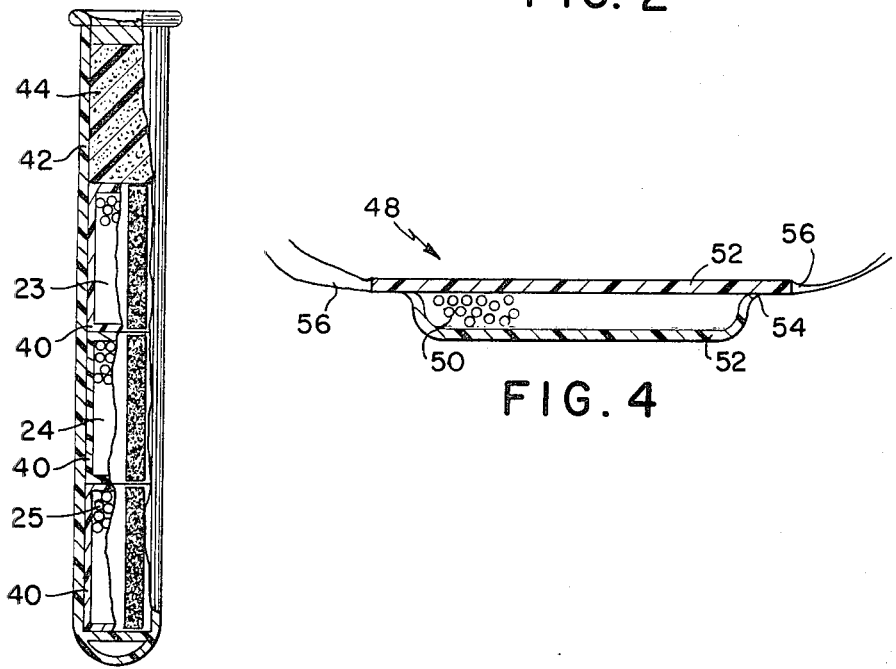
FIG. 3 shows another such device, suitable for use as an oral or rectal thermometer.

FIG. 3 shows still another form of the invention showing such mixtures as 23, 24, and 25 shown in FIG. 1 held in capsules 40 which are placed in a tube 42. A styrofoam spacer 44 is also placed in the tube. Of course, the resulting thermometer does not require any vacuum-manufacturing techniques.

Figure 4:
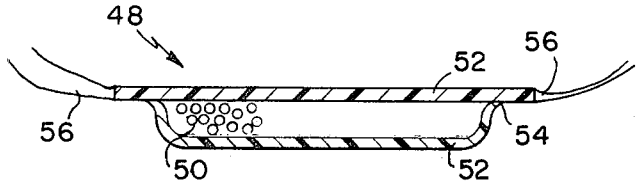
FIG. 4 shows a device using a translucent plastic foam impregnated with a cholesteric crystal mixture.

FIG. 4 shows a fever indicator 48 section of a plastic foam 50 mounted between two thin films 52 (about 0.08 mils in thickness) of a transparent polyethylene and heat sealed at 54 to a bracelet 56 to facilitate attaching indicator 48 to the wrist of a patient.

The clear plastic foam is a flexible, ester-type polyurethane foam sold by Scott Paper Company and having about 100 pores per lineal inch was utilized in this experiment.

It is to be understood that the following claims are intended to cover all of the generic and specific features of the invention herein described.

What is claimed is:

1. A temperature-sensing apparatus formed of
  1. a reservoir comprising a mixture of cholesteric liquid crystals,
  2. a mass of porous translucent material immersed within said mixture, and
  3. means for fastening said reservoir to a body.
2. A temperature-sensing apparatus as defined in claim 1 wherein said translucent, surface-making material is a quantity of inert translucent beads.
3. A temperature-sensing apparatus as defined in claim 2 wherein said translucent, surface-making material is foam material.
4. A temperature-sensing apparatus as defined in claim 3 wherein said foam is a glass foam.
5. A temperature-sensing apparatus as defined in claim 3 wherein said foam is a plastic foam.
6. Apparatus as described in claim 1 wherein said mixture comprises, in addition from about 0.3 to about 20 percent by weight of particulate graphitized carbon or graphite powder.
7. A temperature-sensing apparatus as defined in claim 6 wherein said mixture of liquid crystals comprises at least 50 percent cholesteryl pelargonate and the balance comprises cholesteryl oleyl carbonate.
8. Apparatus as defined in claim 1 comprising a plurality of said mixtures, each adapted to change color at a different temperature.
9. Apparatus as defined in claim 1 wherein said cholesteric liquid crystal mixture is formed of cholesteryl pelargonate and cholesteryl oleyl carbonate, the former forming at least 50 percent by weight of said composition.
10. A temperature-sensing apparatus as defined in claim 1 wherein said mass is fused together to form a reticulated structure.
11. A temperature-sensing apparatus comprising a reservoir containing therein a mixture of cholesteric liquid crystals, said reservoir being formed of a translucent foam.
12. A temperature-sensing apparatus formed of a reservoir comprising a mixture of cholesteric liquid, said reservoir being formed of a translucent plastic foam having an average pore diameter of less than about 10 millimeters.
13. Apparatus as defined in claim 1 wherein said translucent mass is composed of transparent beads having an average diameter between about 0.01 millimeters and about 10 millimeters.
14. A thermally responsive, temperature-indicating mixture comprising a mixture of cholesteric liquid crystals and translucent particles.
15. A mixture as defined in claim 14 comprising, additionally, from about 0.3 to about 20 percent by weight, based on the cholesteric liquid crystals, of a graphitized carbon powder.
16. A mixture as defined in claim 14 wherein said cholesteric liquid crystals mixture is formed of cholesteryl pelargonate and cholesteryl oleyl carbonate, the former forming at least 50 percent of said composition.
17. A thermally responsive, temperature-indicating mixture as defined in claim 14 wherein said particles are between 0.01 millimeters and about 10 millimeters in mean diameter.
18. An improved process for visually sensing a temperature by use of thermally sensitive, color-responsive chemicals comprising the steps of
  1. forming a thin continuous coating of cholesteric liquid crystals on surfaces within voids of a porous mass of translucent material,
  2. placing the coated material on an object the temperature of which is to be sensed, and
  3. observing the color change of said mixture.
19. A process as defined in claim 18 wherein some graphitic carbon powder is included in said mixture.
20. A process as defined in claim 18 wherein the liquid crystals are cholesteryl pelargonate and cholesteryl oleyl carbonate, the former forming at least 50 percent by weight of the liquid crystals in the mixture.
21. A process as defined in claim 18 wherein said porous material is formed of a mass of translucent particles.

22. A process as defined in claim 18 wherein said porous material is a reticulated foam formed of a translucent material.

* * * * *